United States Patent
Iarrera (12)

(10) Patent No.: US 6,203,441 B1
(45) Date of Patent: Mar. 20, 2001

(54) DEVICE FOR LOCKING AND UNLOCKING TWO MECHANICAL MEMBERS BY MEANS OF A BISTABLE ELASTIC ELEMENT

(75) Inventor: Fabrizio Iarrera, Turin (IT)

(73) Assignee: SKF Industrie S.p.A., Turin (IT)

( * ) Notice: Subject to any disclaimer, the term of this patent is extended or adjusted under 35 U.S.C. 154(b) by 0 days.

(21) Appl. No.: 08/994,925

(22) Filed: Dec. 19, 1997

(30) Foreign Application Priority Data

Dec. 20, 1996 (IT) .................................................. TO9601056

(51) Int. Cl.[7] ..................................................... F16C 3/00
(52) U.S. Cl. ...................... 464/182; 464/901; 464/906; 29/243.56; 29/278
(58) Field of Search ........................ 464/139, 178, 464/182, 906, 901; 29/243.56, 278, 280; 384/544; 301/124.1, 126, 131; 403/359.6, 359.5, 359.1; 285/39, 308, 319; 24/456, 488, 513, 570

(56) References Cited

U.S. PATENT DOCUMENTS

| 2,137,929 | 11/1938 | Tinnerman | 29/278 |
|---|---|---|---|
| 2,270,153 | 1/1942 | Tinnerman | 29/278 |
| 3,140,886 | * 7/1964 | Cotilla et al. | 285/308 X |
| 3,165,349 | * 1/1965 | Costes | 285/319 X |
| 4,090,751 | 5/1978 | Krude | 464/906 |
| 4,150,553 | 4/1979 | Aucktor | 464/176 |
| 4,363,164 | 12/1982 | Okada | 29/278 |
| 4,427,085 | 1/1984 | Aucktor | 464/178 |
| 4,765,688 | 8/1988 | Hofmann et al. | 464/906 |
| 5,096,235 | * 3/1992 | Oetiker | 285/39 X |
| 5,209,701 | 5/1993 | Ishikawa et al. | 464/178 |
| 5,549,514 | 8/1996 | Welschof | 384/544 |
| 5,674,011 | 10/1997 | Hofmann et al. | 464/178 |
| 5,853,250 | 12/1998 | Krude et al. | 384/544 |
| 5,890,271 | 4/1999 | Bromley et al. | 29/280 |

FOREIGN PATENT DOCUMENTS

| 4240131 | 6/1994 | (DE) . |
|---|---|---|
| 0272967 | 6/1998 | (EP) . |
| 1090293 | 3/1955 | (FR) . |
| 2618504 | 1/1989 | (FR) . |
| 2210662 | 6/1989 | (GB) . |

\* cited by examiner

*Primary Examiner*—Lynne H. Browne
*Assistant Examiner*—Greg Binda
(74) *Attorney, Agent, or Firm*—Bachman & LaPointe, P.C.

(57) ABSTRACT

A device for locking and unlocking two mechanical members (2, 3) coupled for rotation as a unit (1) by means of a splined coupling (30, 33), comprises an elastic means (36) secured to the first member (2) and adapted for co-operation with the second member (3). The elastic means (36) is comprised of a bistable elastic element (36) having first (50) and second (52) alternative steady positions. The bistable elastic element is provided with hooking means (46, 48) adapted for co-operating in the first steady position (50) with the second member (3) to keep the members (2, 3) axially coupled, and for disengaging in the second steady (52) from the second member (3) to allow separation of the members (2, 3) forming the coupled unit (1).

10 Claims, 6 Drawing Sheets

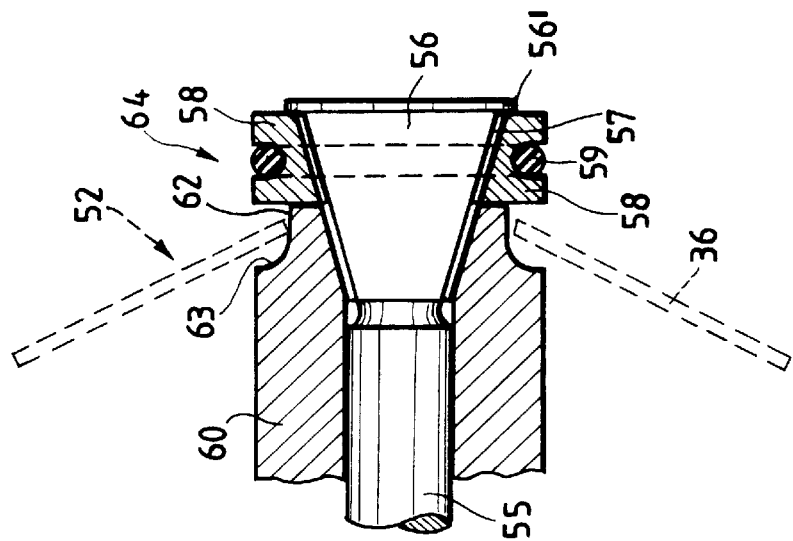
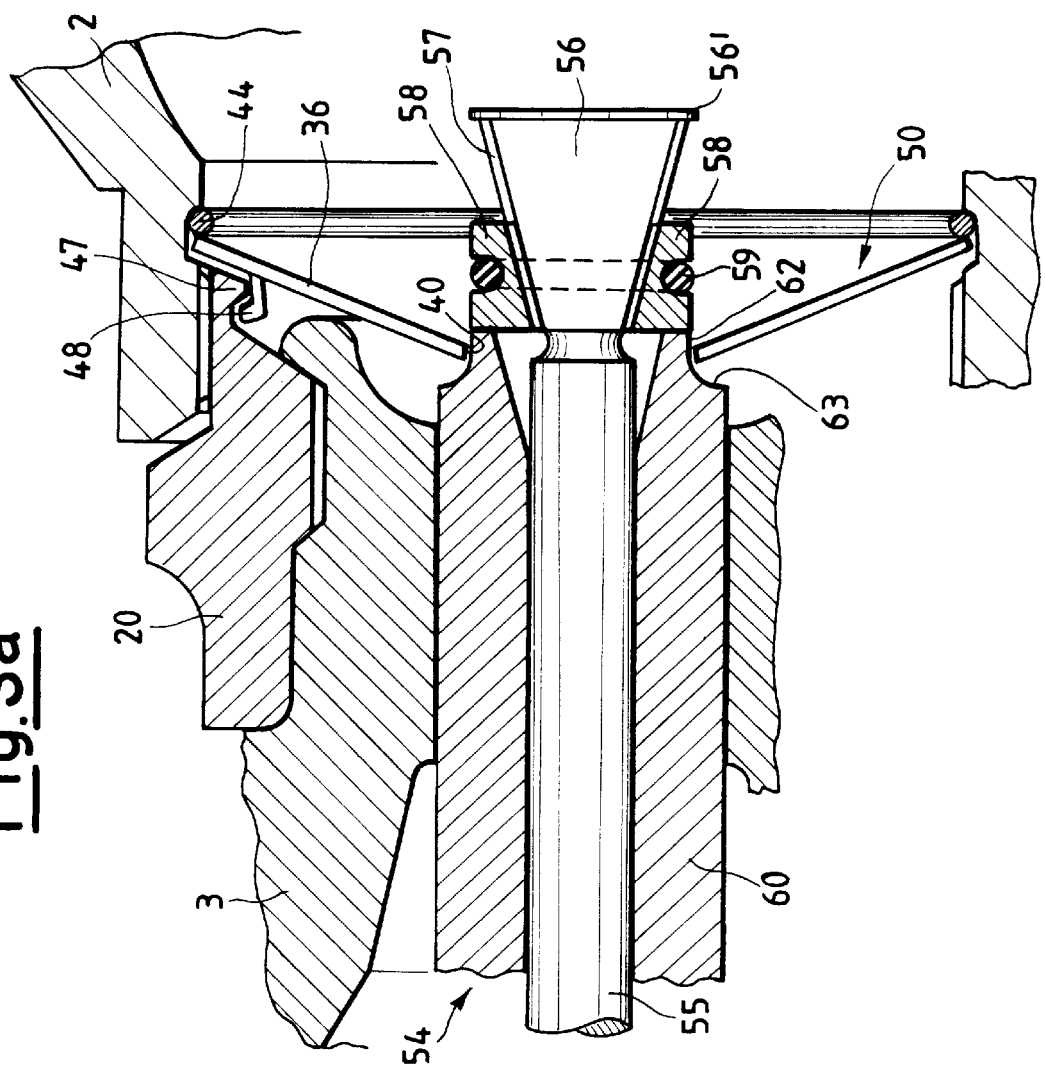

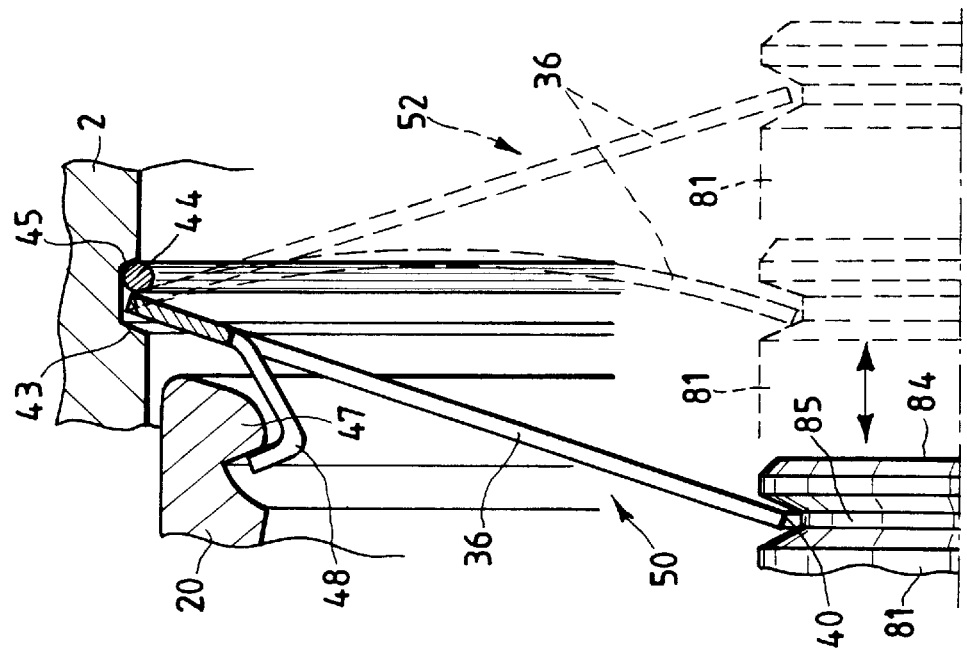
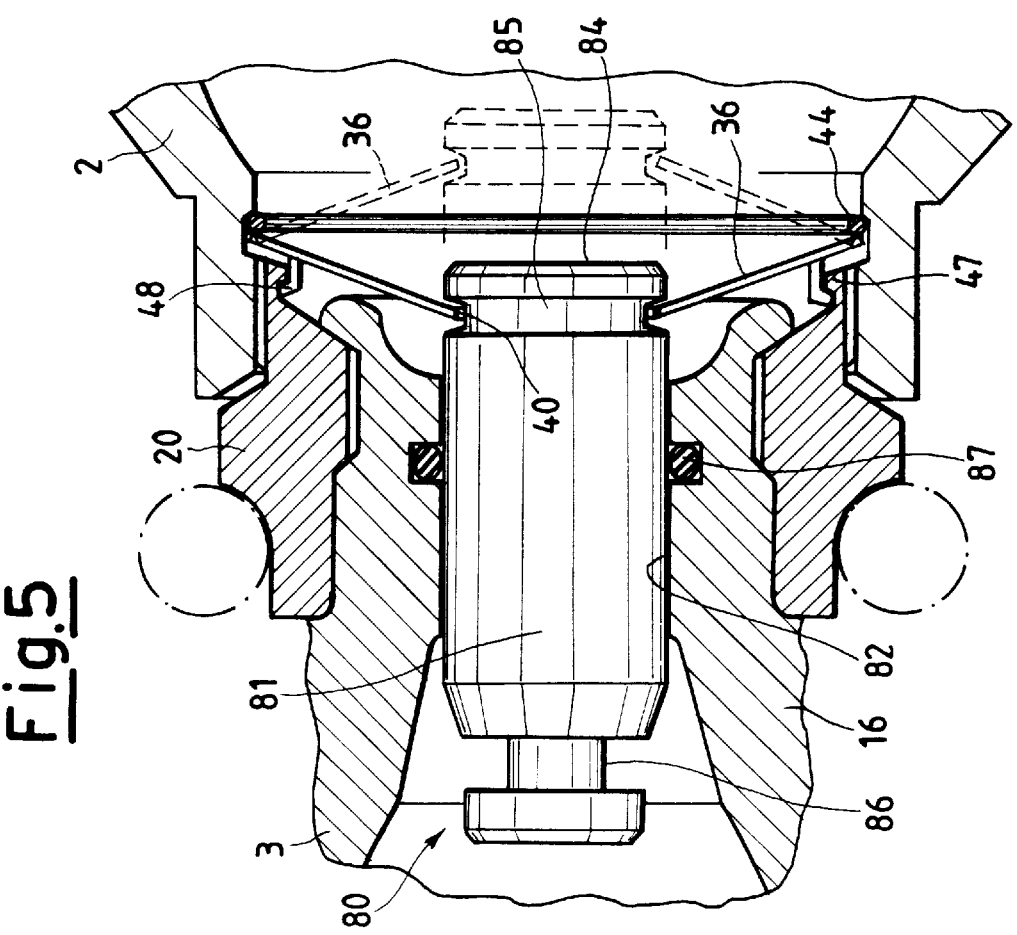

DEVICE FOR LOCKING AND UNLOCKING TWO MECHANICAL MEMBERS BY MEANS OF A BISTABLE ELASTIC ELEMENT

BACKGROUND OF THE INVENTION

The present invention relates to a device for locking and unlocking two mechanical members coupled for rotation as a unit, the device making use of a bistable elastic element. More particularly, the invention refers to a device for locking and unlocking a constant-velocity joint to and from the hub of a driving wheel of a vehicle, in particular an automobile. The bistable elastic element can deform elastically to shift alternately, under the action of a predetermined load, from and to first and second positions in which it takes different spatial arrangements.

In a previous pending patent application, to the same Applicant, there is disclosed a hub joint unit for a motor vehicle driving wheel, wherein the joint is coupled to the hub by means of a splined coupling with axially oriented toothing. The joint is axially locked to the hub by means of an expansion ring fitted in a circular seat formed in part on the joint and in part on the hub.

In such a unit, in order to mount and dismount the joint to and from the hub, particularly when servicing the vehicle, provided near the seat for the elastic ring are radial through apertures for inserting a tool to compress the locking ring radially and disengage it from the joint. However, this solution has the disadvantage of requiring the use of bulky tools that have to act on diametrically opposite positions of the elastic ring. Furthermore, the radial apertures put the inner parts of the joint in communication with the outside through the clearances of the splined coupling. As a result, dirt and moisture can penetrate in the joint.

Accordingly, an object of the present invention is to provide an improved locking/unlocking device capable of overcoming the disadvantages and limitations of the prior art. More particularly, it is a significant object of the present invention to provide a compact locking and unlocking device adapted to fit within the coupled members and operable from the outside, without jeopardising the sealing of the coupling.

SUMMARY OF THE INVENTION

In accordance with the present invention, there is provided a device for locking and unlocking two mechanical members coupled for rotation as a unit by means of a splined coupling. The device includes an elastic member secured to a first member of the two mechanical members and is adapted to co-operation with a second member of the two mechanical members. The elastic member comprises a bistable elastic element having first and second alternative steady positions. The bistable elastic element is provided with a hooking member adapted to co-operate in a first position with the second mechanical member to keep the members axially coupled, and for disengaging in a second position from the second member to allow separation of the mechanical members forming the coupled unit.

BRIEF DESCRIPTION OF THE DRAWINGS

These and other objects, advantages and features of the present invention will become readily apparent to those skilled in the art from a study of the following description of an exemplary preferred embodiment when read in conjunction with the attached drawings, in which:

FIGS. 3a and 3b are partial cross sectional views showing two positions of an actuator device acting on the elastic element of FIG. 2;

FIG. 4 illustrates, to an enlarged scale, a functional detail of the elastic element of FIG. 1;

FIG. 5 shows a first embodiment of an inner member for actuating the device of FIG. 1;

DETAILED DESCRIPTION

Figure 1:
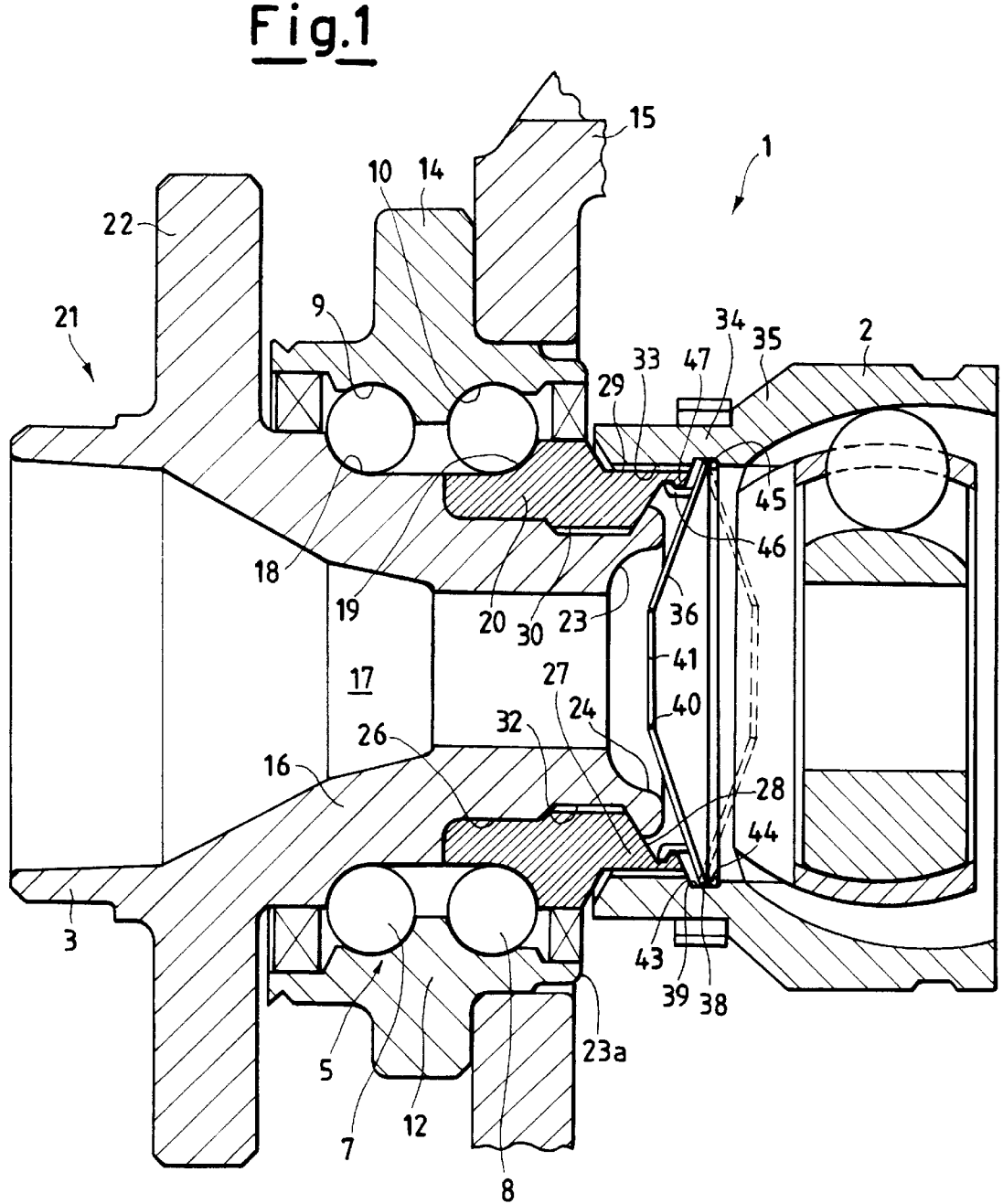
FIG. 1 is a longitudinal cross sectional view of a coupling between a constant-velocity joint and a driving wheel hub of a motor vehicle fitted with a locking/unlocking device in accordance with the present invention.

Referring now to FIG. 1, numeral 1 designates a coupling unit for coupling a first mechanical member 2 and a second mechanical member 3 together, in particular a constant-velocity joint 2, hereinafter referred to simply as joint, of conventional design and not described in further detail herein, and a corresponding hub 3 of a driving wheel, particularly for a motor vehicle. The joint 2 and the hub 3 are fast for rotation by means of a conventional splined coupling. Hub 3 rotates on a bearing 5 with a dual set of bearing balls 7 and 8, engaging corresponding outer raceways 9 and 10 respectively formed in a stationary, radially outer ring 12 of the bearing 5. The outer ring 12 forms a radial flange 14 for connecting the hub-joint unit 1 to a vehicle suspension standard 15.

Hub 3 forms by a cylindrical axle portion 16, providing an inner axial bore 17, open on opposite sides and defining, in the present non-limiting example, the inner ring of bearing 5 having two inner raceways 18 and 19, corresponding to outer raceways 9 and 10, respectively. Inner raceways 18 and 19 are formed on directly on hub 3 and the other on an intermediate ring 20, of known kind, forcefully fitted on hub 3. As an alternative, as shown in phantom line in FIG. 1, raceways 18 and 19 could be formed in respective rings 20', 20, both fitted on the hub 3.

Hub 3 bears at one end 21 a radial flange 22 for mounting the driving wheel and terminates at an opposite end 23 with an annular rim 24.

Axle portion rim 24 projects axially beyond a corresponding end portion 23a of stationary ring 12 of limited thickness, adapt to be cold formed by rolling, as better explained in the following.

Intermediate ring 20 is forcefully fitted with accuracy with a slight interference onto a cylindrical centring seat 26 formed in the hub 3. Intermediate ring 20 extends axially in the direction of joint 2 with an annular portion 27. According to the not-limiting example shown in the drawing, on the outer and inner surfaces of annular portion 27 there are formed two axial teeth set 29 and 30, respectively, for providing respective splined couplings for mechanically securing for rotation the joint 2 on one side with the hub 3 on the other side.

More particularly, the inner toothing 30 is adapt to engage a corresponding toothing 32 of hub 3, whilst the outer teeth 29 engages teeth 33 formed within an axially protruding annular portion 34 of socket 35 of joint 2.

After mounting the ring 20 in seat 26 of hub 3, the hub rim 24 is radially folded and headed tightly by cold forming, particularly by rolling, against the annular portion 28 of ring 20. In this manner, the ring 20 is rigidly and securely locked onto the hub 3.

In order to mount and/or dismount the joint 2 onto/from hub 3 in a simple and quick manner, there is provided, in accordance with the invention, an axial locking/unlocking device fitted within the socket 35 of joint 2 and operable from the outside.

The locking/unlocking device according to the invention comprises a bistable elastic element 36, in the illustrated example consisting of an elastic, metallic diaphragm 36, preferably made out of spring steel and of annular disc-shape, slightly cup-shaped. Disc 36 is secured by means of a peripheral edge 38 thereof to one of the mechanical members to connect, e.g. a constant-velocity joint 2. Further, disc 36 provides an inner peripheral edge 40 defining a circular opening 41 facing the inner bore 17 of hub 3.

When disc 36 is urged by an axial force alternately acting in one direction or in the opposite direction on the inner edge 40, disc 36 deforms elastically to alternately take two stable positions with oppositely directed concavities, of which one is shown in the drawings in full line and the other in dotted line.

The outer edge 38 is accommodated in a circumferential seat within socket 35 with a certain radial play allowing slight adjustment of disc 36 when passing from one stable position to the other. Disc 36 is axially locked in seat 39 by a shoulder 43 on one side, and by an elastic expansion ring 44 housed in a circular groove 45 formed in the socket 35 opposite to the seat of disc 36.

Disc 36 is fitted with hooking means 46 axially protruding from the disc surface towards the element to be connected, in this example the hub 3. The hooking means 46 are adapted to co-operate with a circular rim or relief 47 formed at the annular end portion 27 of ring 20.

Figure 2A:
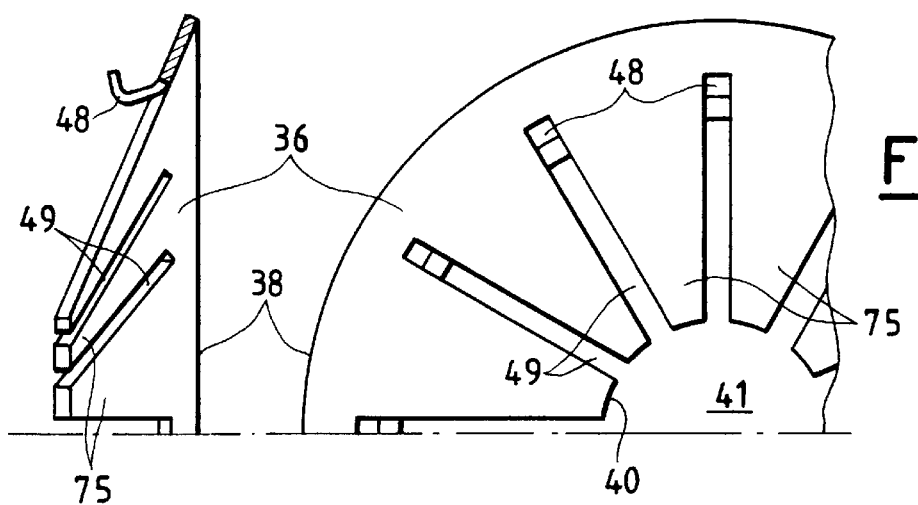
FIGS. 2a, 2b and 2c depict alternative embodiments, respectively, of the bistable elastic element of the device of FIG. 1.

More particularly, the hooking means 46 consist of a number of hooks 48 half-blanked in radial apertures 49 of disc 36 (FIG. 2a). Hooks 48 are angularly equally spaced along a circle concentric to edges 38 e 40, in correspondence of the ring 47 of ring 20. Hooks 40 are formed so as to engage rim 47 when disc 36 is disposed in a first steady position 50 (illustrated in full line). In this manner, the hooks axially secure the hub 3 to the socket 35 of joint 2 to which disc 36 is fixed.

When disc 36 is deformed by an axial force applied to the disc inner edge 40, it shifts to its second steady position 52 (illustrated in phantom line). In this shifting step, the hooks 48 rotate counter-clockwise (FIG. 4) about a virtual fulcrum coincident with the outer edge 38 and disengage from rim 47. Therefore, in this second position 52 of disc 36, the joint 2 can be separated from the hub 3 by axially sliding along the toothing 30.

To apply an axial actuating force to disc 36, a thin, elongated tool 54 (FIGS. 3a, 3b) is inserted through the axle portion bore 17. Tool 54 is composed of a cylindrical stem 55 ending with a portion 56 having a conical surface 57, around which there are disposed several blocks 58 in form of circular sectors. Blocks 58 are held by an elastic ring 59, for example a helical spring or a rubber O-ring. Blocks 58 are axially slidable along the conical surface 57 until they reach an end position 64 at the maximum diameter of conical portion 56. In this location, the blocks 58 are stopped by a stopping edge 56' axially limiting the conical surface 57 on the side opposite to stem 55. In the resting condition, owing to the action of elastic ring 59, the blocks 58 are disposed at the minimum diameter of conical portion 56, near stem 55.

Blocks 58 are so sized in the radial dimension so as to be inserted through the aperture 41 of disc 36.

Fitted on stem 55 is an axially sliding sleeve 60 terminating at the end facing the blocks 58 with a circular seat 62. Seat 62 is delimited by a shoulder 63 and adapted for accommodating the inner edge 40 of disc 36.

To unlock the joint 2 from the hub 3, operations are as follows. Tool 54 is inserted through the bore 17 of axle portion 16, until the blocks 58 pass over the inner edge 40 of disc 36 in the locking arrangement (to the left in FIG. 3a) and the inner edge 40 abuts against the shoulder 63. Then, the sleeve 60 is biased against the inner edge 40 to axially displace the disc 36 and make this overcome an intermediate, unsteady position, after which the disc 36 elastically snaps to the second steady position 52.

In this arrangement, the hooks 48 disengage from hub 3, allowing to dismount the joint 2 from the hub.

In the reverse operation, to lock the joint 2 to the hub 3 after the joint has been fitted over the axial toothing 30, the tool 54 is once again inserted through the aperture 41 of disc 36, or, vice versa, through the bore 17 of hub 3, passing beyond the inner edge 40 with blocks 58. Then, the sleeve 60 is pushed axially relative to the stem 55 to bring the blocks 58 to the maximum diameter of the conical portion 56 in contact with the axial stopping edge 56'. Finally, the stem 55 is pulled in the opposite direction, pushing the blocks 58 against the inner edge 40 of disc 36 and forcing disc 36 to move back to the first steady position 50, wherein the hooks 48 engage rim 47.

Figure 2B:
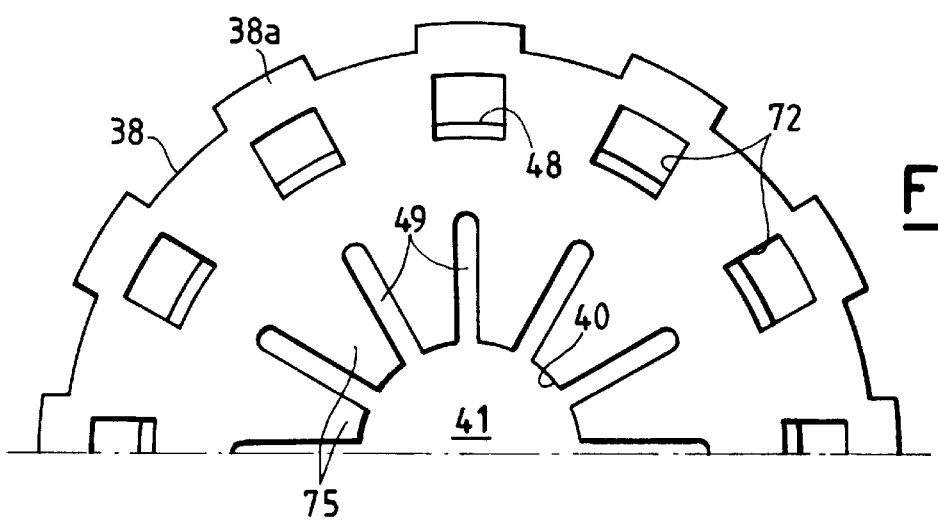
Figure 2C:
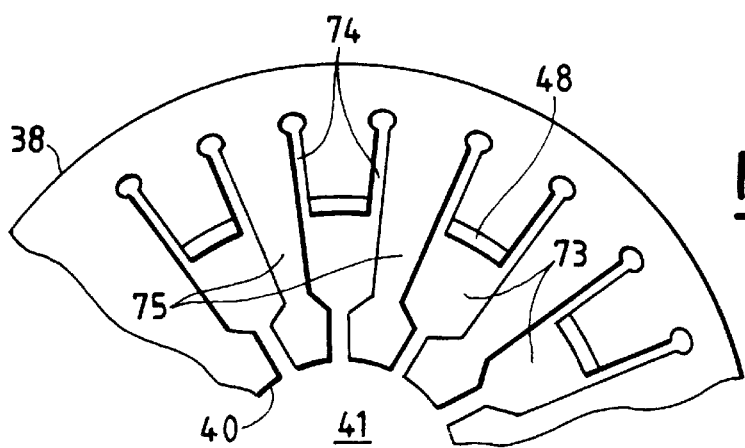
Figure 6:
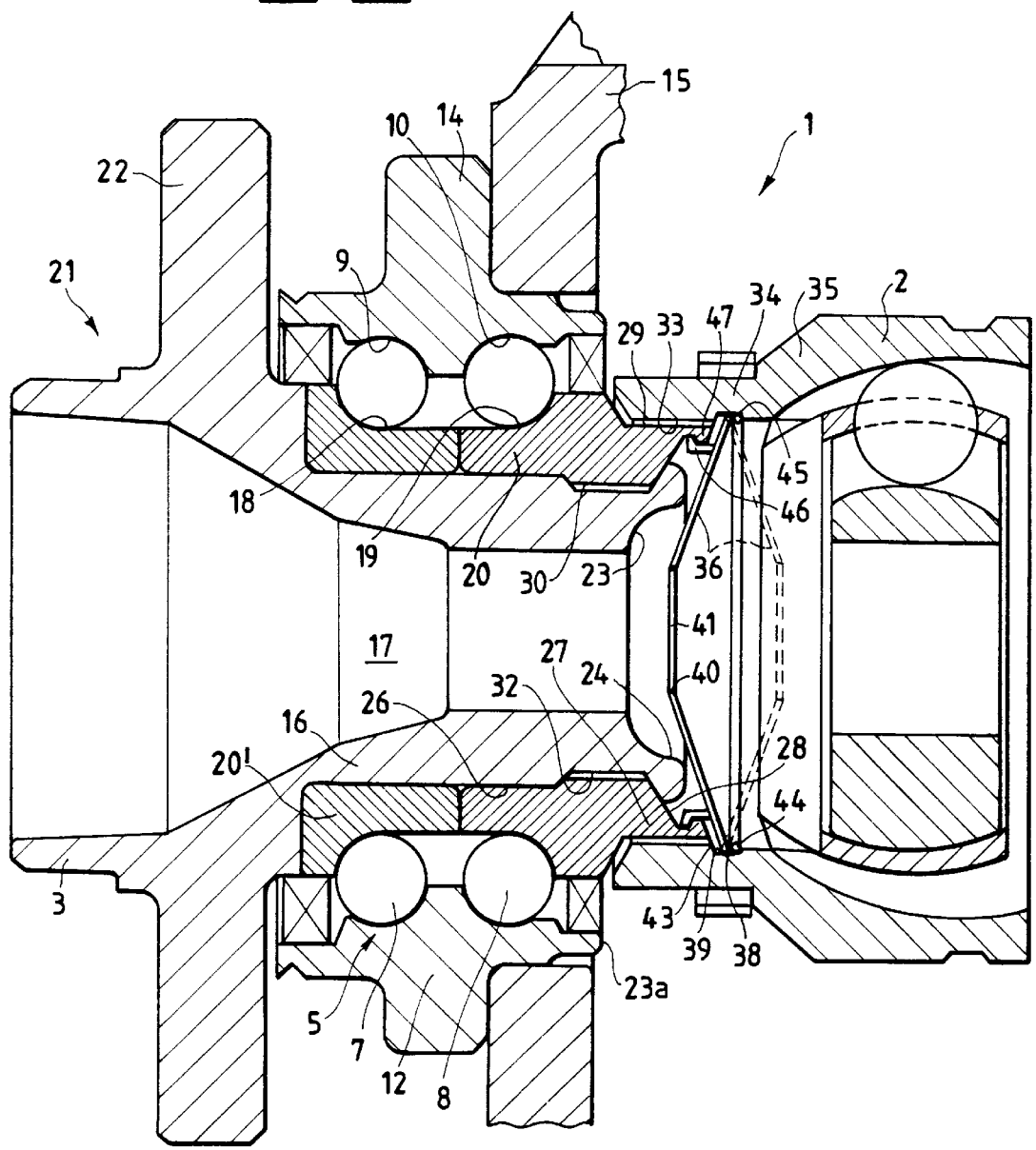
FIG. 6 shows an alternate embodiment for the hub and race rings of FIG. 1.

FIGS. 2a to 2c illustrate in further detail three possible embodiments, respectively, of the elastic disc 36. In FIG. 2a, the hooks 48 are formed by folding outwardly from disc 36 a plurality of metal strips obtained by half-blanking radial slits 49 open towards the central opening 41 of disc 36. In FIG. 2b, the hooks 48 are formed in apertures 72 disposed in a circle proximate to the outer edge 38 of disc 36 near the radial slits 49. The outer edge 38 is not continuous, but formed by extensions 38a distributed at an angle near the apertures 72. Said extensions can be used for locking the disc 36, as an alternative to or in combination with the above described locking system (consisting of the shoulder 43 and the elastic expansion ring 44). The extensions snap-fit into respective seats formed within the joint socket portion 35. In FIG. 2c, the hooks 48 are formed in the zone 73 defined by two legs 74 of a Y-shaped slit. As apparent, due to the construction of slits 49, the inner edge 40 of disc 36 is discontinuous and the same slits define intermediate radial legs 75 which are helpful in facilitating the radial flexion of the disc as this passes from one steady position to the other.

As an alternative to the use of a complex tool as described herein above, in accordance with another aspect of the present invention there is used a member 80 for actuating the disc 36 (FIG. 5). Actuating member 80 is mounted within the hub 9 and is operable from the outside. Actuating member 80 is composed of a pin 81 axially slidable within a central bore 82 of axle portion 16. Pin 81 extends axially towards joint 2 with an end portion 84 provided with a peripheral groove 85 for permanently accommodating the inner edge 40 of disc 36. The opposite end of pin 81 provides a dovetail tang 86 adapted to be grasped by a special actuator tool, not illustrated, inserted through the bore 17 of axle portion 16. Interposed between the pin 81 and the bore 82 is a sealing ring 87 for hermetically sealing the inner ambient of the joint 2. By moving the pin 81 in either direction, the disc 36 is shifted from one steady position to the other, thereby allowing to unlock or lock the joint 2 from or to the hub 3.

Figure 7:
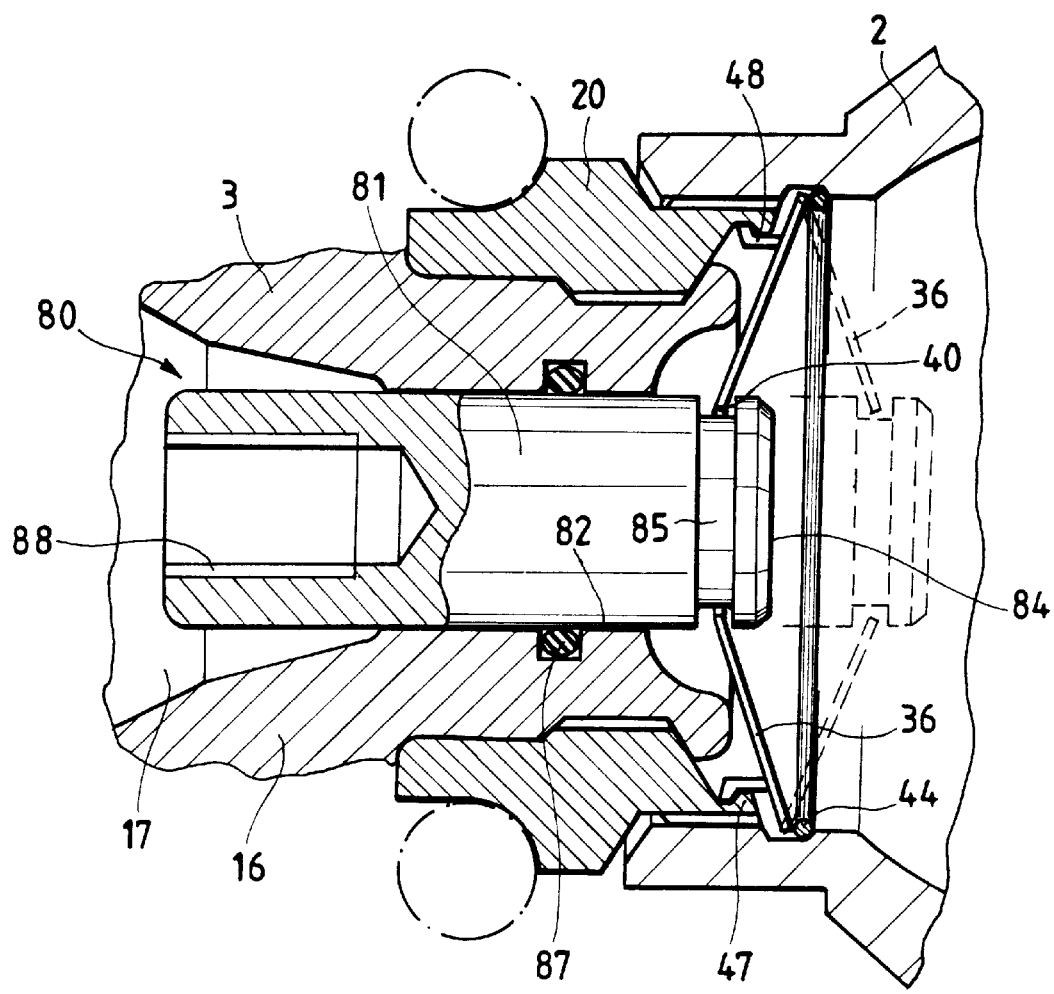
FIG. 7 shows a second embodiment of pin construction of FIG. 5.

In the bottom part of FIG. 7 there is shown an alternative construction of pin 81 wherein the tang 86 is replaced by a threaded bore 88 in which the actuator tool ca be screwed.

What is claimed is:

1. A unit comprising two mechanical members (2, 3) and a device for locking and unlocking the two mechanical members (2, 3) wherein the two mechanical members are coupled for rotation to form the unit (1) by means of a splined coupling (30, 33), said device comprising elastic means (36) secured to a first member (2) of said two members (2, 3) and adapted for co-operation with a second member (3) of said two members (2, 3), characterised in that said elastic means (36) comprise a bistable elastic element (36) having first (50) and second (52) alternative steady positions, said bistable elastic element being provided with hooking means (46, 48) adapted for co-operating in said first position (50) with said second member (3) to keep said members axially coupled, and for disengaging in said second position (52) from said second member (3) to allow separation of members (2, 3) forming said coupled unit (1) said bistable elastic element (36) consists of a metallic diaphragm of substantially cup-like circular disc shape (36) adapted to elastically deform for alternatively reaching two steady positions (50, 52) upon being subjected to axial forces of alternative, opposite directions wherein said hooking means (46) consist of a number of hooks (48) axially folded and projecting from a surface of said cup-like circular disc shape (36), said hooks being angularly equally spaced on a circumference concentric and adjacent to an outer edge (38) of said disc (36), said hooks being so shaped as to engage a circular rim (47) disposed within an end (24) of said second mechanical member (3) when said disc is in said first steady position (50).

2. A device according to claim 1, characterised in that said cup-like circular disc shape (36) has a peripheral outer edge (38), said disc being secured to said first member (2) by fitting said outer edge (38) in a circular seat (39) formed adjacent and close to said splined coupling (30) for connection to said second member (3).

3. A device according to claim 2, characterised in that said outer edge (38) is axially locked in said seat (39) by means of a seat shoulder (43) and an elastic expansion ring (44) mounted in a seat formed opposite to the shoulder (43) relative to the edge of the disc (36).

4. A device according to claim 3, characterised in that said disc (36) has an inner edge (40) defining a central aperture (41) facing an inner bore (17) of said second mechanical member (3), said disc (36) having angularly equally spaced elongated radial slits (49) communicating with said central aperture (41) on one side and adjacent to said hooks (48) at the opposite side.

5. A device according to claim 4, characterised in that said disc (36) is adapted for being moved from one steady position to the other of said steady positions (50, 52) by means of an actuator tool (54) operable from the outside through said bore (17) to apply to said disc (36) an axial force alternately in either opposite direction.

6. A device according to claim 3, characterised by further comprising a member (80) for actuating said disc (36), said actuator member (80) being comprised of a pin (81) axially sliding in a central bore (82) of said second mechanical member (3), said pin (81) being provided, at one end thereof, with a peripheral groove (85) adapted to accommodate said inner edge (40) of the disc (36); at the other end, said pin having a coupling member (86) for receiving a tool operable from the outside to move said disc (36) from and to said first and second steady positions.

7. A device according to claim 6, characterised in that said coupling member is comprised of a dovetail tang (86).

8. A device according to claim 6, characterised in that said coupling member is comprised of a threaded bore (88).

9. A device according to claim 2, characterised in that said outer edge (38) is discontinuous and formed by angularly equally spaced radial extensions (38a), said edge being axially locked in said seat (39) by snapping action of said radial extensions (38a).

10. A device according to claim 1, characterised in that said first and second mechanical members consist of a constant-velocity joint (2) and a hub (3), respectively.

* * * * *